(12) United States Patent
Saada et al.

(10) Patent No.: US 10,717,533 B2
(45) Date of Patent: Jul. 21, 2020

(54) DEFORMABLE SEAT FOR A VEHICLE

(71) Applicant: Expliseat, Paris (FR)

(72) Inventors: Benjamin Saada, Paris (FR); Vincent Tejedor, Issy les Moulineaux (FR)

(73) Assignee: EXPLISEAT, Paris (FR)

( * ) Notice: Subject to any disclaimer, the term of this patent is extended or adjusted under 35 U.S.C. 154(b) by 0 days.

(21) Appl. No.: 15/750,078

(22) PCT Filed: Aug. 4, 2016

(86) PCT No.: PCT/EP2016/068627
§ 371 (c)(1),
(2) Date: Feb. 2, 2018

(87) PCT Pub. No.: WO2017/021485
PCT Pub. Date: Feb. 9, 2017

(65) Prior Publication Data
US 2018/0229846 A1 Aug. 16, 2018

(30) Foreign Application Priority Data
Aug. 5, 2015 (FR) .................................. 15 57556

(51) Int. Cl.
*B64D 11/06* (2006.01)
*B60N 2/68* (2006.01)
*B60N 2/427* (2006.01)

(52) U.S. Cl.
CPC ...... *B64D 11/0619* (2014.12); *B60N 2/42709* (2013.01); *B60N 2/68* (2013.01); *B64D 11/0648* (2014.12)

(58) Field of Classification Search
CPC ............ B64D 11/0648; B64D 11/0619; B60N 2/42709; B60N 2/68
See application file for complete search history.

(56) References Cited

U.S. PATENT DOCUMENTS 8,506,015 B2 * 8/2013 Le ........................... B60N 2/68
297/452.18
2001/0052724 A1 * 12/2001 Kamper ............... B60N 2/4228
297/452.2
(Continued)

FOREIGN PATENT DOCUMENTS

EP       3459852 A1 *  3/2019  ......... B64D 11/0601
FR       2849814 A1 *  7/2004  ............... B60N 2/64
(Continued)

OTHER PUBLICATIONS

International Search Report for International Application No. PCT/EP2016/068627, dated Feb. 9, 2017.
(Continued)

*Primary Examiner* — Timothy J Brindley
(74) *Attorney, Agent, or Firm* — Pearne & Gordon LLP

(57) ABSTRACT

The invention relates to a vehicle seat, preferably multiple-seater, which is deformable at the centre thereof and makes it possible to respond to deformation stresses in the event of an accident, impact or crash. In the case of a three-seater seat, the seat is primarily formed by four legs (10), a central seat portion (12), two end seat portions (11) and three backrests (13). The seat portions are bordered by two side bars (18) and one front bar and one rear bar. The front and rear bars are each formed by a central bar (14) or (16) which is extremely flexible, while the end bars (15, 17) of the end seats (11) are extremely rigid. The invention can also be used in aircraft seats.

10 Claims, 3 Drawing Sheets

(56) References Cited

U.S. PATENT DOCUMENTS

| | | | | |
|---|---|---|---|---|
| 2002/0053792 | A1* | 5/2002 | Yamaguchi | B60N 2/4221 |
| | | | | 280/748 |
| 2003/0020306 | A1* | 1/2003 | Eckendorff | B60N 2/22 |
| | | | | 297/216.1 |
| 2006/0028038 | A1* | 2/2006 | Glasgow | B60N 2/4235 |
| | | | | 293/132 |
| 2009/0084925 | A1 | 4/2009 | Kismarton | |
| 2013/0193737 | A1* | 8/2013 | Morimoto | B60N 2/42718 |
| | | | | 297/452.18 |
| 2015/0336477 | A1* | 11/2015 | Matsui | B60N 2/682 |
| | | | | 297/344.15 |
| 2016/0250958 | A1 | 9/2016 | Saada et al. | |
| 2017/0080832 | A1* | 3/2017 | Fujita | B60N 2/2231 |
| 2017/0136929 | A1 | 5/2017 | Tejedor et al. | |
| 2018/0022373 | A1* | 1/2018 | Vermillion | B62B 9/00 |
| | | | | 297/452.2 |

FOREIGN PATENT DOCUMENTS

| | | | | |
|---|---|---|---|---|
| FR | 2897019 A1 | * | 8/2007 | ............... B60N 2/22 |
| GB | 1188076 A | * | 4/1970 | ........... B60N 2/4228 |
| JP | H11 278128 A | | 10/1999 | |
| JP | H05 032399 B2 | | 9/2012 | |
| WO | 2012002195 A1 | | 1/2012 | |
| WO | WO-2013013955 A1 | * | 1/2013 | ............... B60N 2/68 |
| WO | WO-2015187633 A1 | * | 12/2015 | ............. B64D 11/06 |

OTHER PUBLICATIONS

Written Opinion for International Application No. PCT/EP2016/068627, dated Feb. 9, 2017.

Preliminary Search Report for French Application No. 1557556, dated Jun. 13, 2016.

* cited by examiner

DEFORMABLE SEAT FOR A VEHICLE

FIELD OF THE INVENTION

The invention relates to seats for vehicles, in particular aircrafts, preferably multi-occupant seats that are deformable under some conditions.

PRIOR ART AND PROBLEM TO BE SOLVED

Seats of transport means, such as aircrafts, are subjected to drastic tests to guarantee the security of the passengers who are transported, in particular in case of vehicle impacts. Tests have to evaluate, on the one hand, their resistance to imposed displacement tests, and on the other hand their resistance to imposed force tests. The displacements imposed during these tests require a relatively flexible seat structure. However, the force being imposed requires a rather rigid structure, because the maximum displacement for this bias is limited, in order to allow passenger evacuation after a possible crash or accident.

Figure 1:
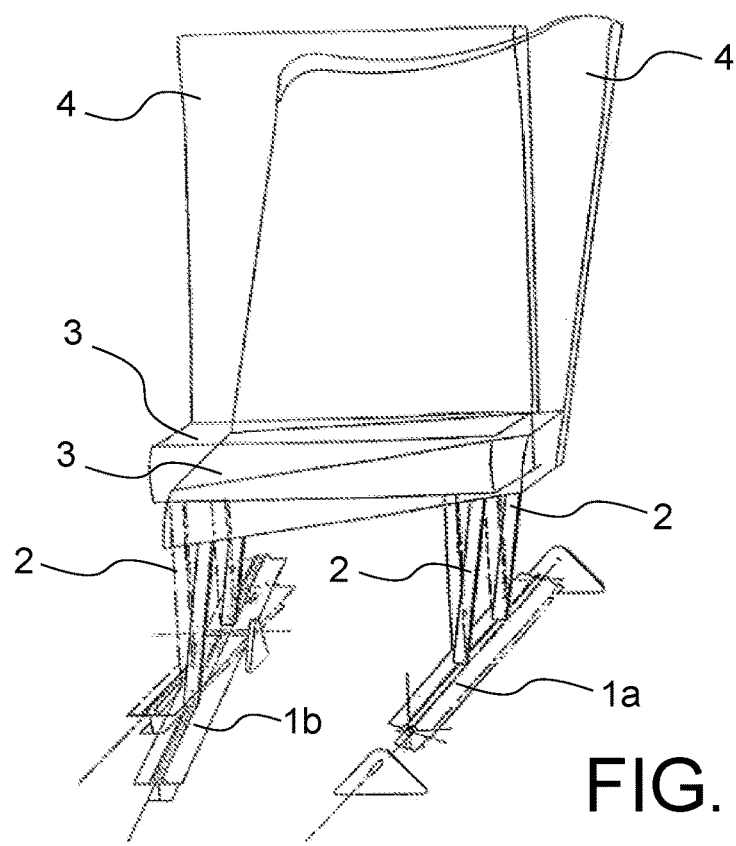

FIG. 1 shows the displacement imposed to the seat during this test type. The rails 1A and 1B of the seat, being attached to the vehicle floor, undergo, during the test, a downward rotation by 10°, as a "pitch", and a side rotation by 10°, as a "roll". Both these movements force the seat to be significantly deformed, as shown by the two different positions of each seat element, namely the two rails 1A and 1B, the four legs 2 of the seat portion 3 and the backrest 4. It is understood that, if the seat structure is too rigid, it breaks before reaching the deformation imposed by the test. It is noticed that the seat portion 3 and the backrest 4 not only are displaced, but are deformed with respect to their initial shape.

It is set forth that a second test consists in pulling on the seat with a dummy, with an imposed acceleration to try to simulate the behaviour of a passenger's body fastened to the seat, during an accident. Since the dummy's masse is constant, the imposed acceleration is translated into a force imposed at the points for securing the seat belt to the seat. The tests drive this acceleration up to 16 g, that is 16 times the gravity acceleration, with a 80 kg dummy, resulting in a 1 280 kg, or 12.8 kN force. At the end of this test, the forward displacement of the seat must not be too high, to allow an easy aircraft evacuation.

Both these tests thus require conflicting properties for the seat. The imposed deformation test requires a flexible structure, whereas the imposed force test requires a rigid structure, which must thus not be displaced too much with the imposed force.

Figure 2:
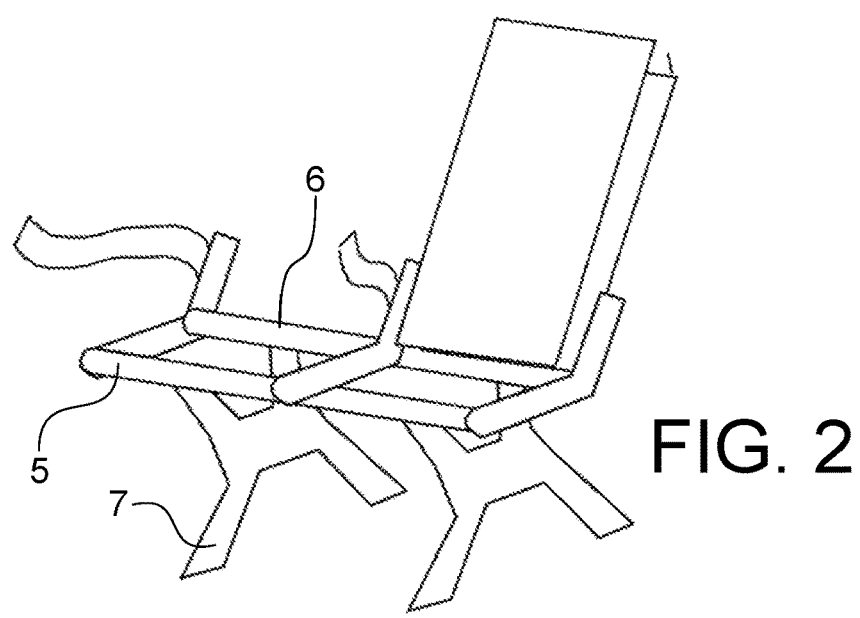

In reference to FIG. 2, a current solution consists in using at the front and the rear of the seat, front 5 and rear 6 bars, parallel to each other to delimit the seat portion. These front 5 and rear 6 bars consist of metal hollow cylinders with a small thickness. They are dimensioned to have a significant moment of inertia, because of their large diameter, in order to be deformed as little as possible during the imposed force test. On the other hand, this shape with a large diameter and a small thickness enables to be ovalised with a small force, such that the seat is deformed with a small force, during the imposed displacement test. It is observed that, in this solution with a two-occupant seat, the legs 7 are attached to the framework of the seat and in particular of the seat portion, more precisely to the front 5 and rear 6 bars, but in the middle of the seat portion.

This solution is relatively simple to implement, but remains relatively burdensome because the front 5 and rear 6 bars have to combine two conflicting biases, namely a large flexibility and a large rigidity.

The purpose of the invention is to overcome these drawbacks by having a small weight seat likely to pass the tests described in the preceding paragraphs.

OBJECT OF THE INVENTION

The underlying principle, according to the invention, to overcome this problem is to adapt the rigidity of the front and rear bars to several parts. Thus, the different parts of each front and rear bar will meet the flexibility requirement and the rigidity requirement.

The main object of the invention is thus a seat for a vehicle comprising at least one seat portion, a front bar and a rear bar supporting the seat portion.

According to the invention, the front and rear bars include at least one end part positioned on at least one side of the central part, the central part of at least one of the front or rear bars having a higher flexibility than the mean section of the end part(s) thanks to a tubular section having at least partly a reduced thickness with respect to the mean section of the end part(s), the end part(s) being more rigid than the central part.

In the main embodiment of the invention, the end part(s) has (have) a thickness increasing from outside the seat to the central part of the seat placed above a leg.

In this case, the end part(s) is (are) preferably tubular with a thickness increasing from the end of the seat to the central part.

Preferably, the external diameter of the end part(s) is equal to the internal diameter of the central part, the end part(s) is (are) embedded in the central part.

Preferably, the central part consists of a material from the group comprising deformable plastic material and metal.

In the preferential embodiments of the invention, the end part(s) consist(s) of a material from the group comprising composite materials based on carbon fibres, glass fibres, or a metal.

In one embodiment of the seat of the invention, there are three seat portions, a central seat portion supported by the central parts of the front and rear bars, and two end seat portions supported by the end parts of the front and rear bars, at least one leg being located at both interfaces of the central parts and of both their corresponding end parts.

In another embodiment of the seat according to the invention, the seat portion is unique, the seat having only a single occupant.

In another embodiment of the seat according to the invention, the seat has two seat portions to have two occupants, at least one leg being located at the interface of the central parts and of both their corresponding end parts.

In another embodiment of the seat according to the invention, it has two seat portions to have two occupants, a central seat portion and an end seat portion, a leg being located at the middle of the end seat portion (11), the other being located at the opposite side of the central seat portion.

In another embodiment of the seat according to the invention, it has four occupants with two central seat portions supported by the central parts of the front and rear bars, and two end seat portions supported by the end parts of the front and rear bars, at least one leg being located at both interfaces of the central parts and both their corresponding end parts.

LIST OF THE FIGS.

Figure 3:
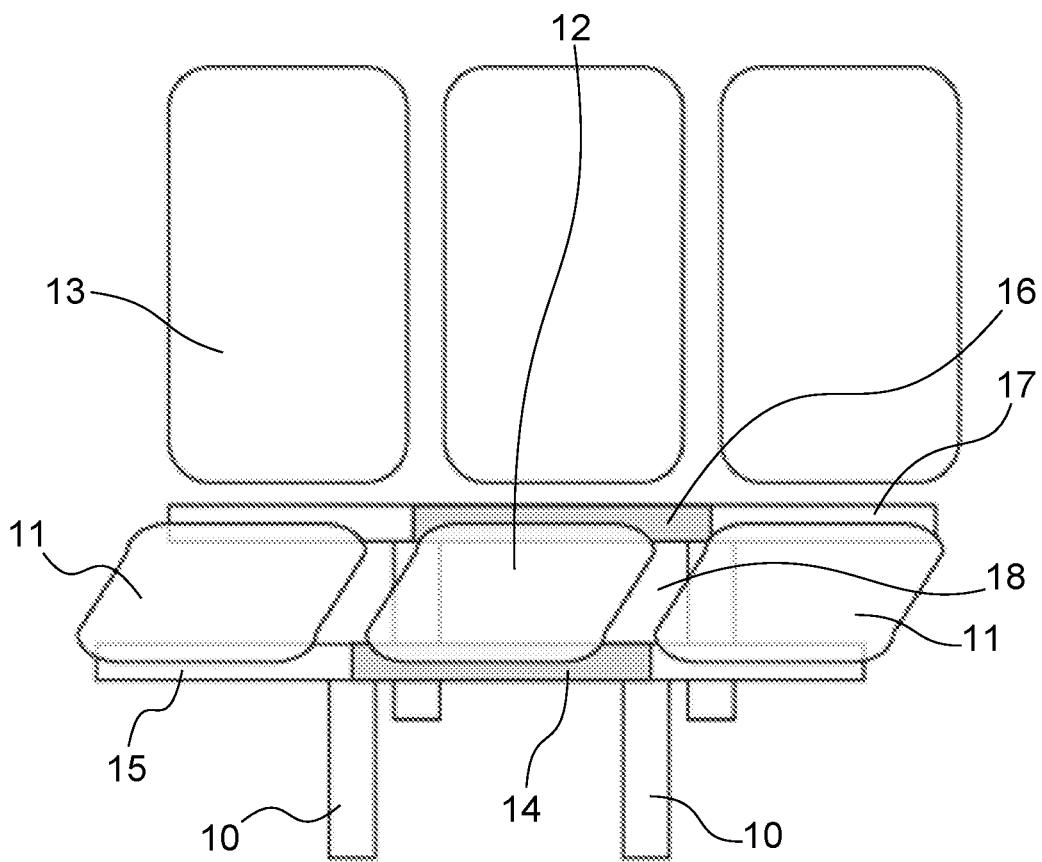
Figure 4:
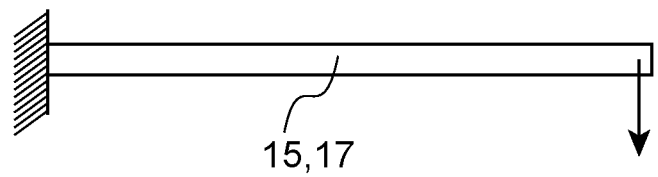
Figure 5:
Figure 6:
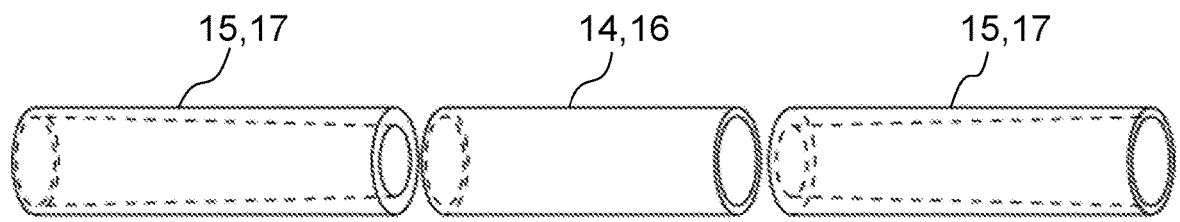
Figure 7:
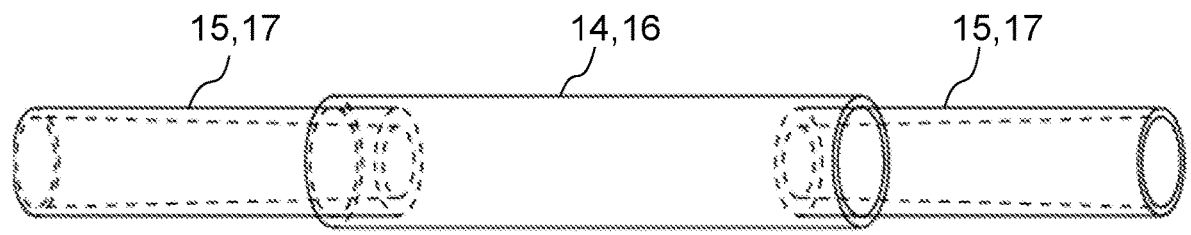

The invention and its different technical characteristics will be better understood upon reading the following description of a favoured embodiment of the invention, accompanied with some Figs. respectively representing:

FIG. 1, a vehicle seat subjected to tests that the seat according to the invention has to undergo;

FIG. 2, a two-occupant seat of prior art;

FIG. 3, a scheme relating to a main embodiment of the seat according to the invention in the case where it includes three occupants;

FIG. 4, a mechanical scheme relating to the stresses in a bar of the seat portion end part of the seat according to the invention;

FIG. 5, a preferential embodiment of this bar of the seat portion end part of the seat according to the invention;

FIG. 6, the three parts of a front or a rear bar of the seat according to the invention comprising the seat portion end parts and the seat portion central part; and FIG. 7, an embodiment of a front or a rear bar of the seat according to the invention, after being assembled.

DETAILED DESCRIPTION OF ONE EMBODIMENT OF THE INVENTION

In reference to FIG. 3, a contemplated embodiment of the seat according to the invention includes three occupants. This seat is comprised of four legs 10, being more or less vertical, and which are connected to two side bars 18 which surround a central seat portion 12. Two end seat portions 11 surround the central seat portion 12. Three backrests 13 complete the three occupants formed by the three seat portions, a central seat portion 12 and two end seat portions 11.

The structure of the seat according to the invention is completed by a front bar and a rear bar which supports the end seat portions 11 and the central seat portion 12. According to the invention, these front and rear bars consist of three parts. They each have a central part 14 and 16, each surrounded or extended by end parts 15 and 17. At least one central part 14 or 16, but preferably both central parts 14 and 16 have a higher flexibility than the other parts of the structure, in particular the side bars 18 and the end parts 15 and 17. To achieve this flexibility, these central parts 14 and 16 have a tubular section with a reduced thickness with respect to the mean section of the end parts 15 and 17. However, their external diameter is not lower. Preferably, it is even higher than the external diameter of the end parts 15 and 17.

As can be noticed in FIG. 3, the end seat portions 11 overhang from the legs 10 of the seat. The end parts 15 and 17 should thus have a large rigidity. To do this, and in reference to FIG. 4, these end parts 15 and 17 have an increasing thickness, starting from the end of the seat to the anchoring point of these end parts 15 and 17 to the side bars 18 and the legs 10. In other words, the case of the load of the end seat portions 11 corresponds to a half-embedded flexion, as illustrated in FIG. 4. To maximise rigidity of these end parts 15 and 17, the mass of which has been set beforehand, the thickness of these end parts 15 and 17 has to be linearly increasing with an imposed profile between the distal end and the embedding point. Thus, these end parts 15 and 17 are very thin outside the seat and very thick at their embedding point.

This technical solution enables the front and rear bars to be flexible between the ground anchoring points, made by the legs 10 and to be rigid beyond this. It is noted that when the legs 10 are rigidly connected to the ground, the rigidity of the central parts 14 and 16 of the front and rear bars has no influence on the rigidity of the entire seat structure, because the strains are directly transferred to the legs 10. The central parts 14 and 16 are thus flexible and can be deformed between their two ends. The end parts 15 and 17 of the front and rear bars can thus resist a strain at the end thereof.

The thickness of the tube making up the central parts 14 and 16 is defined to allow a relatively heavy passenger to be seated thereon.

FIG. 5 illustrates one embodiment of these end parts 15 and 17 with an optimised rigidity. The external diameter is fixed on the entire length for the passenger interface to be smooth. The internal diameter in turn changes to vary the thickness.

In reference to FIG. 6, if a dismounted front bar or rear bar is considered, then two end parts 15 or 17 surrounding a central part 14 or 16 are obtained.

FIG. 7 shows a mounted front or rear bar. It is to be remarked that the legs are assumed to be infinitely rigid and should allow a perfect embedding. In practice, the legs 10 are subjected to very significant moments, and should consequently be oversized. To limit the moments undergone by the legs 10, it is considered that they play the role not of an embedding, but of a simple support. This requires to connect the different front and rear bars previously defined to have low or even zero moments at the interface with the legs 10. To achieve this, the rigidity of the front and rear bars is enhanced by providing an embedding or covering of the end parts 15 and 17 in or on the central parts 14, 16. This embedding corresponds to the connection place with the legs 10. This limits the moments undergone by the legs 10. Of course, in this case, the internal diameter of the central parts 14, 16 corresponds to the external diameter of the end parts 15 or 17 to allow a forced or snap embedding.

Smoothing the moments along all of the front or rear bars prevents the legs to be biased in moment and makes it possible to be limited to a force bias in the bias axis. Indeed, during a mechanical test, the strains exerted on the front or rear bars result in low or zero moments at the interfaces with the legs 10 and the resulting strain is limited to the strain applied generally to the structure, by preserving the forces being applied. In the absence of this moment smoothing, that is under the hypothesis where moments are applied at the interfaces, the legs 10 undergo in addition to the strain generally applied to the structure, the strain necessary to maintain two disjoined bar parts aligned.

Depending on the spanning length between the different front and rear bars of the central part or end parts, a trade-off can be obtained between mass and rigidity of the front or rear bars of end parts or between mass and flexibility of the front or rear bars of the central part. Spanning the different bar parts results from the moment smoothing on the front or rear bars.

The connection between the different bar parts is made by means of rivets, bonding or welding, depending on the material being used.

In the technically possible forms of the front and rear bars, the front and rear bars of the central part 14, 16 need, for use thereof, to have very deformable shapes, and thus to have a plastic phase. As materials, deformable plastic materials or a metal can be used. As regards the front and rear bars of end parts, they need to be very rigid and do not need to be deformable. The materials that can make up these front and rear bars of end parts 15, 17 can be composite materials, purely elastic materials, that is not having a plastic deformation phase (so-called "brittle" materials), for example based on carbon fibres or glass fibres. A metal can also be used.

The form previously described is relating to the seat represented in FIG. 3 and thus is only an exemplary embodiment. Indeed, one can contemplate to make a seat for one occupant by taking only the elements relating to the seat central occupant represented in FIG. 3 with flexible front and rear bars of the central part.

It can even be contemplated to have a four-occupant seat, by dividing in two the central occupant of FIG. 3, the legs 10 surrounding all of both central occupants.

A non-symmetrical two-occupant seat can be contemplated, with a central seat portion an one end seat portion. At least one leg is located on the side of the central part opposite to the end seat portion, the other being located at the middle of the end seat portion. Thus, the end part of the front and rear bars only occupies a part of the side of the end seat portion.

A two-occupant seat could even be contemplated with the four legs opening into the middle of each of both occupants, on the front and rear bars. In this case, the central part of each front and rear bar, with a great flexibility, will correspond thereby to two of the half-occupants of this two-occupant seat. In this case, end parts of the front and rear bars each correspond to end halves of the seat portions of these two occupants.

The invention claimed is:

1. A vehicle seat comprising at least one seat portion, a front bar and a rear bar supporting the seat portion, wherein
   the front and rear bars each include at least one end part positioned on at least one side of a central part,
   the central part of at least one of the front or rear bars having a higher flexibility than the at least one end part due to a tubular section having at least partly a reduced thickness with respect to a mean section of the at least one end part,
   the at least one end part being more rigid than the central part,
   an external diameter of the at least one end part is equal to an internal diameter of the central part, and
   the at least one end part is embedded in the central part.

2. The vehicle seat according to claim 1, wherein the at least one end part has a thickness increasing from outside the vehicle seat to the central part of the seat portion placed above a leg.

3. The vehicle seat according to claim 2, wherein the at least one end part is tubular with a thickness increasing from an end of the vehicle seat to the central part.

4. The vehicle seat according to claim 1, wherein the central part consists of a material from the group comprising deformable plastic material and metal.

5. The vehicle seat according to claim 1, wherein the at least one end part consists of a material from the group comprising composite materials based on carbon fibres, glass fibres, or a metal.

6. The vehicle seat according to claim 1, wherein there are three seat portions, a central seat portion supported by the central parts of the front and rear bars, and two end seat portions, each supported by a single end part of each of the front and rear bars, and at least one leg being located at both interfaces of the central parts and of both their corresponding end parts.

7. The vehicle seat according to claim 1, wherein the vehicle seat is configured to have only a single occupant.

8. The vehicle seat according to claim 1, wherein the vehicle seat has two seat portions to have two occupants, at least one leg being located at an interface of the central parts and of both their corresponding end parts.

9. The vehicle seat according to claim 1, wherein the vehicle seat has two seat portions to have two occupants, a central seat portion and an end seat portion, a leg being located at a middle of the end seat portion, the other being located at an opposite side of the central seat portion.

10. The vehicle seat according to claim 1, wherein the vehicle seat is configured to have four occupants with two central seat portions supported by the central parts of the front and rear bars, and two end seat portions, each supported by a single end part of each of the front and rear bars, and at least one leg being located at both interfaces of the central parts and of both their corresponding end parts.

* * * * *